(12) United States Patent
Tsai (10) Patent No.: US 8,107,164 B2
(45) Date of Patent: Jan. 31, 2012

(54) WINDOW SYSTEM AND LIGHT GUIDING FILM THEREIN

(75) Inventor: Jung-Lieh Tsai, Tainan County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 0 days.

(21) Appl. No.: 12/793,490

(22) Filed: Jun. 3, 2010

(65) Prior Publication Data

US 2011/0296795 A1    Dec. 8, 2011

(51) Int. Cl.
*G02B 17/00* (2006.01)
*G03B 21/60* (2006.01)

(52) U.S. Cl. .................... 359/443; 359/592; 359/598

(58) Field of Classification Search .................. 359/592, 359/594–595, 597–599, 601, 613; 264/1.9; 362/145; 160/34, 166.1
See application file for complete search history.

(56) References Cited

U.S. PATENT DOCUMENTS

| 721,256 | A | | 2/1903 | Wadsworth | |
|---|---|---|---|---|---|
| 4,089,594 | A | | 5/1978 | Ewin | |
| 4,557,565 | A | * | 12/1985 | Ruck et al. ................ | 359/595 |
| 5,295,051 | A | | 3/1994 | Cowling | |
| 5,461,496 | A | | 10/1995 | Kanada et al. | |
| 5,650,875 | A | | 7/1997 | Kanada et al. | |
| 5,880,886 | A | | 3/1999 | Milner | |
| 6,311,437 | B1 | | 11/2001 | Lorenz | |
| 6,367,937 | B2 | | 4/2002 | Koster | |
| 6,435,683 | B1 | | 8/2002 | Milner | |
| 6,616,285 | B2 | | 9/2003 | Milner | |
| 7,538,943 | B2 | * | 5/2009 | Shinbo ................ | 359/459 |
| 7,872,801 | B2 | * | 1/2011 | Kojima et al. ............ | 359/457 |
| 2005/0068630 | A1 | * | 3/2005 | Nitz et al. .................. | 359/613 |
| 2005/0254130 | A1 | * | 11/2005 | Graf et al. .................. | 359/604 |
| 2008/0030859 | A1 | | 2/2008 | Usami | |
| 2008/0291541 | A1 | * | 11/2008 | Padiyath et al. .......... | 359/569 |
| 2009/0009870 | A1 | * | 1/2009 | Usami ...................... | 359/592 |
| 2011/0043919 | A1 | * | 2/2011 | Ko et al. .................... | 359/592 |

FOREIGN PATENT DOCUMENTS

| CN | 2297498 Y | 11/1998 |
|---|---|---|
| TW | M379027 U1 | 4/2010 |
| WO | WO0017477 | 3/2000 |

* cited by examiner

*Primary Examiner* — Clayton E LaBalle
*Assistant Examiner* — Kevin Butler
(74) *Attorney, Agent, or Firm* — WPAT, P.C.; Anthony King (57) ABSTRACT

The present invention relates to a light guiding film including a film base and at least one microstructure. The microstructure is disposed on a side of the film base, and comprises a first surface and a second surface. A first inclination angle is between the first surface and a reference plane, the reference plane is perpendicular with the film base, and a second inclination angle is between the second surface and the reference plane. The total energy of the output light beams with the output angles from 85 to 120 degrees is more than 40% of the total energy of the output light beams with the output angles from 0 to 180 degrees. Therefore, the light guiding film can guide the incident light beams into a room near horizontally and avoid glare.

26 Claims, 5 Drawing Sheets

WINDOW SYSTEM AND LIGHT GUIDING FILM THEREIN

BACKGROUND OF THE INVENTION

1. Field of the Invention

The present invention relates to a window system and light guiding film therein, and more particularly to a window system and light guiding film capable of changing the direction of incident light.

2. Description of the Related Art

The conventional sunlight guiding apparatus is of various types, such as plate, shutter or film, which is disposed on or near a window of a room and used for guiding the sunlight beams outside the room into the room. The sunlight beams are directed to illuminate a reflector on the ceiling in the room. Then, the sunlight beams are reflected by the reflector, and used for indoor lighting or auxiliary illumination. In addition, in some of the conventional sunlight guiding apparatus, the sunlight beams are guided into the room directly without being reflected by the reflector on the ceiling.

The conventional sunlight guiding apparatus can guide the direct light beams and the diffused light beams of the sunlight to the reflector on the ceiling by retraction and/or reflection, so as to illuminate the interior of the room uniformly and reduce the discomfort glare. Further, the use of the conventional sunlight guiding apparatus can save the energy used by the lighting equipment during daytime.

The defect of the conventional sunlight guiding apparatus is described as follows. If there is no reflector on the ceiling, the sunlight beams can not be directed to the space far away from the window. That is, the guided sunlight beams in the room fall on the floor or upon the ceiling near the window. Thus, the illuminating effect is not ideal.

Therefore, it is necessary to provide a window system and light guiding film therein to solve the above problems.

SUMMARY OF THE INVENTION

The present invention is directed to a light guiding film, which comprises a film base and at least one microstructure. The film base has a first side and a second side opposite the first side. The microstructure is disposed on the first side or the second side of the film base, and comprises a first surface and a second surface above the first surface. A first inclination angle is between the first surface and a reference plane, the reference plane is perpendicular with the film base, and a second inclination angle is between the second surface and the reference plane.

Whereby a plurality of incident light beams becomes a plurality of output light beams after passing through the light guiding film. An output angle is defined as the angle between the output light beam and the light guiding film. The output angle is defined as 0 degree when the output light beam is downward and parallel with the light guiding film, and the output angle is defined as 180 degrees when the output light beam is upward and parallel with the light guiding film. The total energy of the output light beams with the output angles from 85 to 120 degrees is more than 40% of the total energy of the output light beams with the output angles from 0 to 180 degrees.

In the present invention, the light guiding film can guide the incident light beams into a room near horizontally and avoid glare.

The present invention is further directed to a window system, which comprises a first protective plate, a second protective plate and a light guiding film. The second protective plate is fixed to the first protective plate. The light guiding film is the same as the above-mentioned light guiding film, and is disposed in an accommodating space between the first protective plate and the second protective plate. The light guiding film is attached to the first protective plate or the second protective plate, and comprises a film base and at least one microstructure.

DETAILED DESCRIPTION OF THE INVENTION

Figure 1:
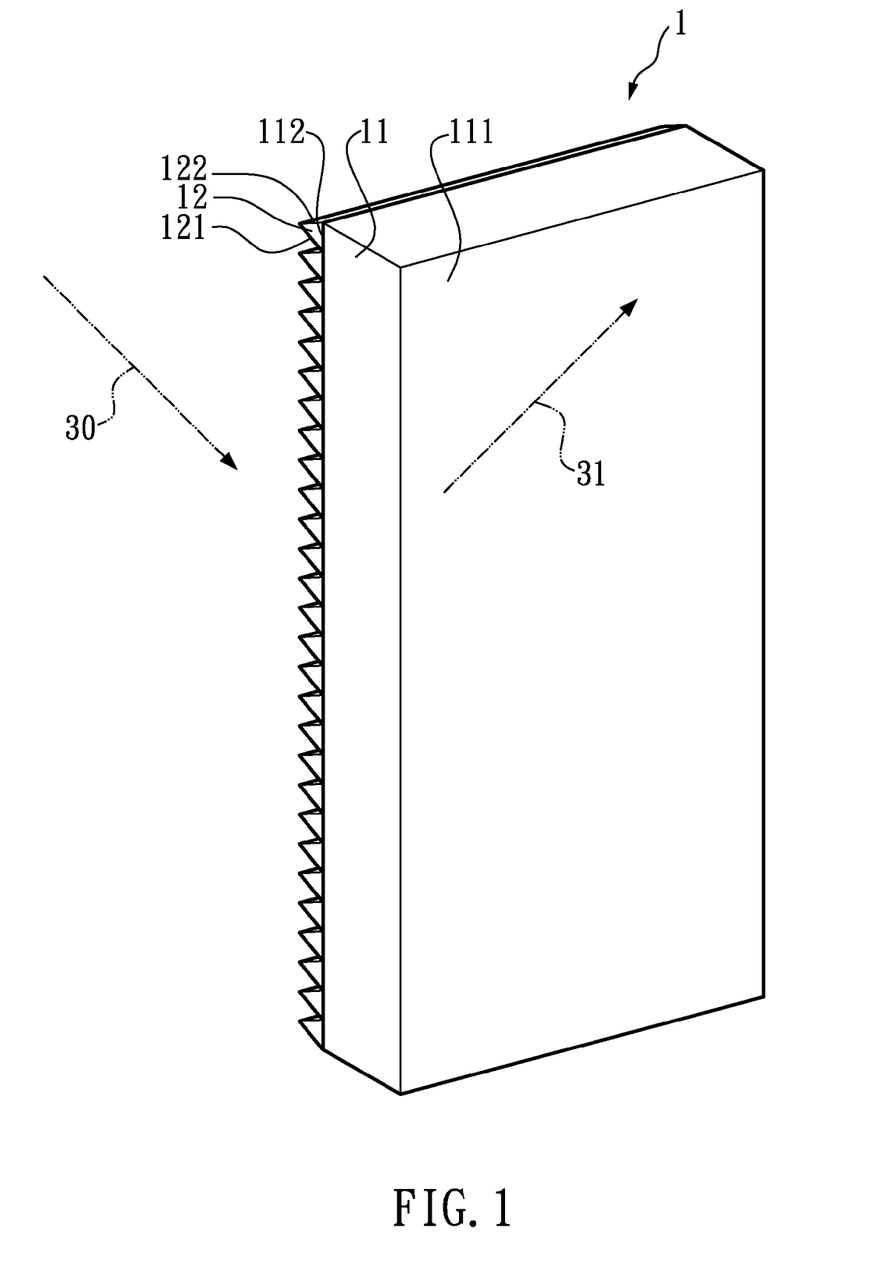
FIG. 1 is a perspective view of a light guiding film according to a first embodiment of the present invention.
Figure 2:
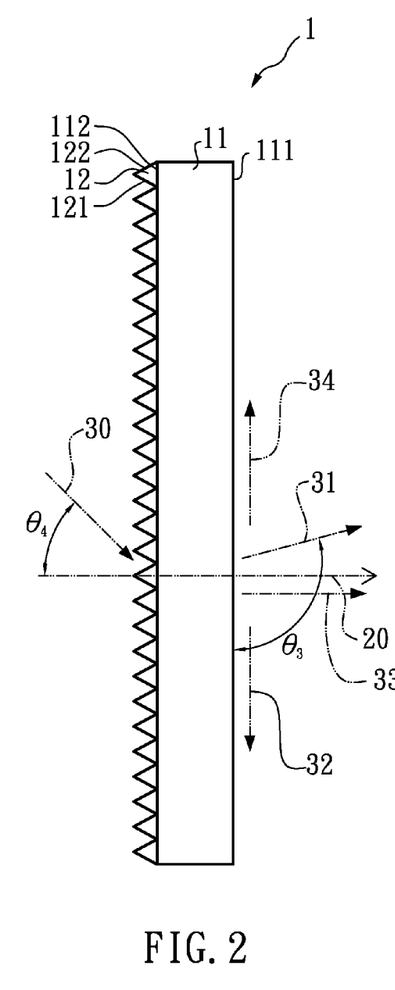
FIG. 2 is a side view of a light guiding film according to a first embodiment of the present invention.
Figure 3:
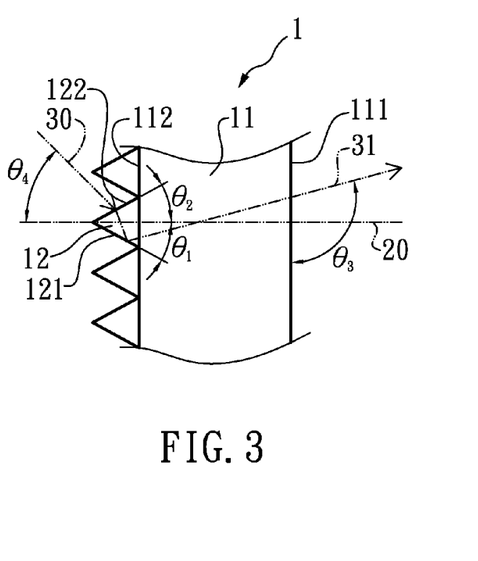
FIG. 3 is a partially enlarged view of FIG. 2.

FIG. 1 shows a perspective view of a light guiding film according to a first embodiment of the present invention. FIG. 2 shows a side view of a light guiding film according to a first embodiment of the present invention. FIG. 3 shows a partially enlarged view of FIG. 2. The light guiding film 1 comprises a film base 11 and at least one microstructure 12. In the embodiment, the light guiding film 1 comprises a plurality of microstructures 12. The film base 11 has a first side 111 and a second side 112, and the second side 112 is opposite the first side 111.

The microstructure 12 is disposed on the second side 112 of the film base 11, and comprises a first surface 121 and a second surface 122. The second surface 122 is above the first surface 121. A reference plane 20 is defined as a phantom plane that is perpendicular with the first side 111 or the second side 112 of the film base 11. That is, when the light guiding film 1 stands upright, the reference plane 20 is a phantom horizontal plane. A first inclination angle $\theta_1$ is between the first surface 121 and the reference plane 20. A second inclination angle $\theta_2$ is between the second surface 122 and the reference plane 20.

Figure 4:
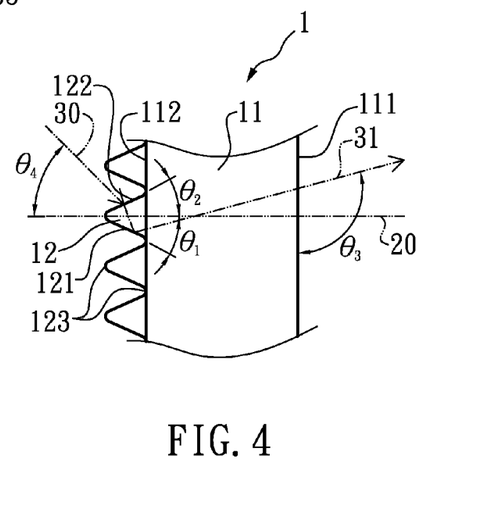
FIG. 4 is another type of the light guiding film of the first embodiment of the present invention.

As shown in FIG. 3 and FIG. 4, in the embodiment, the value of the first inclination angle $\theta_1$ is between 21 to 25 degrees, and the value of the second inclination angle $\theta_2$ is between 20 to 28 degrees. Preferably, the value of the first inclination angle $\theta_1$ is different from that of the second inclination angle $\theta_2$, wherein the first inclination angle $\theta_1$ is 23 degrees, and the second inclination angle $\theta_2$ is 24 degrees.

In the embodiment, the cross section of the microstructure 12 is substantially triangle, and the first surface 121 intersects the second surface 122. However, the microstructure 12 may further comprises a curved chamfer 123, as shown in FIG. 4. The curved chamfer 123 is disposed between the first surface 121 and the second surface 122, and adjacent to the first surface 121 and the second surface 122.

The material of the film base 11 is the same as that of the microstructure 12. They are made of light transmissible material, such as polymethyl methacrylate (PMMA), arcylic-based polymer, polycarbonate (PC), polyethylene terephthalate (PET), polystyrene (PS) or a copolymer thereof, with a refraction index of 1.35 to 1.65. It is to be understood that the material of the film base 11 may be different from that of the microstructure 12.

During actual application, a plurality of incident light beams 30 becomes a plurality of output light beams 31 after passing through the light guiding film 1. In the embodiment, the light guiding film 1 is attached to a glass (not shown) of a window of a room, the incident light beams 30 are the sunlight beams outside the room, and the output light beams inside the room. The microstructure 12 faces the incident light beams 30.

As shown in FIG. 2, an output angle $\theta_3$ is defined as the angle between the output light beam 31 and the light guiding film 1. The output angle $\theta_3$ is defined as 0 degree when the output light beam (i.e., the output light beam 32) is downward and parallel with the light guiding film 1. The output angle $\theta_3$ is defined as 90 degree when the output light beam (i.e., the output light beam 33) is horizontal and parallel with the reference plane 20. The output angle $\theta_3$ is defined as 180 degrees when the output light beam (i.e., the output light beam 34) is upward and parallel with the light guiding film 1

An incident angle $\theta_4$ is defined as the angle between the incident light beam 30 and the reference plane 20. The incident angle $\theta_4$ is defined as positive when the incident light beam 30 is downward, the incident angle $\theta_4$ is defined as 0 degree when the incident light beam (not shown) is horizontal and parallel with the reference plane 20, and the incident angle $\theta_4$ is defined as negative when the incident light beam (not shown) is upward.

As shown in FIG. 2, the incident light beams 30 enter the microstructure 12 through the second surface 122 of the microstructure 12 by refraction, and are reflected by the first surface 121 of the microstructure 12. Then, the reflected incident light beams 30 pass through the film base 11 to become the output light beams 31. It is to be noted that the incident light beams 30 are reflected by the first surface 121 due to the specific design of the first inclination angle $\theta_1$ and the second inclination angle $\theta_2$. Therefore, when the incident light beams 30 are all downward, more than 50% of the output light beams 31 are upward. Further, the output light beams 31 will concentrate in a specific range of the output angle $\theta_3$, that is, the total energy of the output light beams 31 with the specific range of the output angle is a peak when it is compared with other output light beams 31 with other range of the output angle.

In the embodiment, the incident angles $\theta_4$ of the incident light beams 30 are from 30 to 60 degrees, and the total energy of the output light beams 31 with the output angles from 85 to 120 degrees is more than 40% of the total energy of the output light beams 31 with the output angles from 0 to 180 degrees.

In other embodiments, the incident angles $\theta_4$ of the incident light beams 30 are from 30 to 60 degrees, and the total energy of the output light beams 31 with the output angles from 85 to 120 degrees is more than 50%, 60% or 70% of the total energy of the output light beams 31 with the output angles from 0 to 180 degrees.

Figure 5:
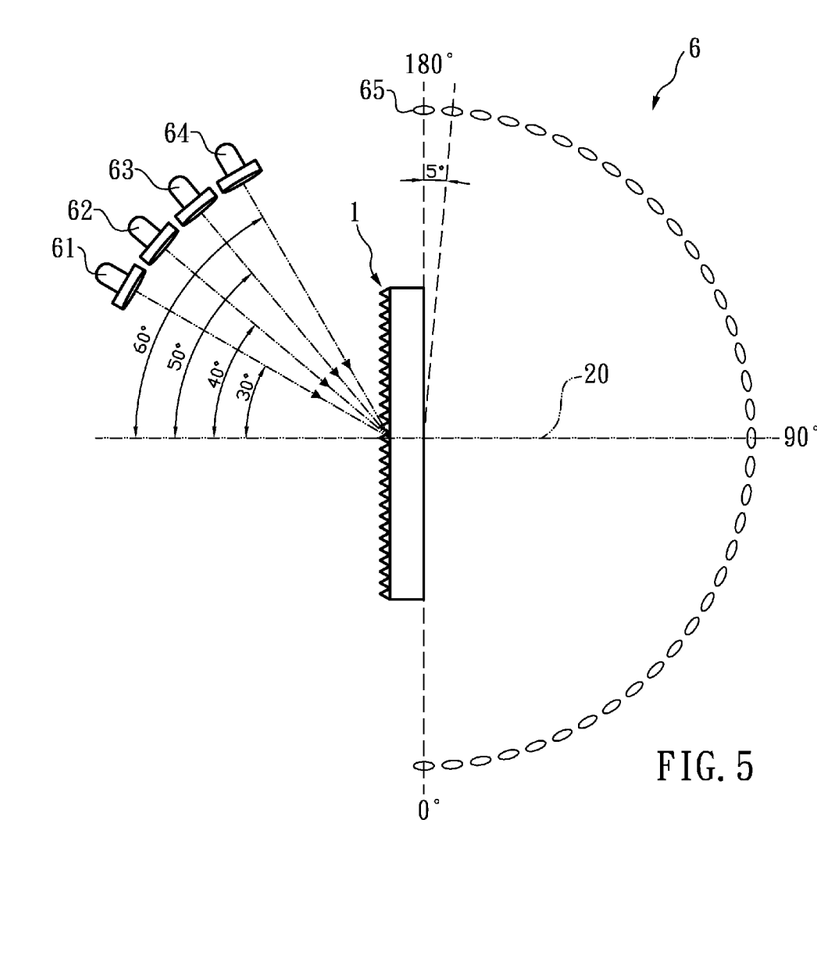
FIG. 5 is a schematic view of a testing apparatus for simulating the actual application of the light guiding film according to the present invention.

FIG. 5 shows a schematic view of a testing apparatus for simulating the actual application of the light guiding film according to the present invention. The testing apparatus 6 includes four light sources 61, 62, 63, 64 and thirty seven receivers 65. The light guiding film 1 is disposed in the center of the testing apparatus 6, the light sources 61, 62, 63, 64 are disposed on the left side of the light guiding film 1, and the receivers 65 are disposed on the right side of the light guiding film 1. The receivers 65 surround the light guiding film 1 to form a semicircular appearance, and the intervals therebetween are equal, so that the receivers 65 can measure the energy (for example, lumen) of the output light beams 31 in every 5 degrees form 0 to 180 degrees.

The light source 61 is used for generating the incident light beam with 30 degrees, the light source 62 is used for generating the incident light beam with 40 degrees, the light source 63 is used for generating the incident light beam with 50 degrees, and the light source 64 is used for generating the incident light beam with 60 degrees. The light sources 61, 62, 63, 64 are turned on at the same time.

The simulation parameters are as follows. The refraction index of the light guiding film 1 is 1.59. The size of the light guiding film 1 is 10*10 mm². The diameter of each of the light sources 61, 62, 63, 64 is 4 mm. The diameter of each of the receivers 65 is 13 mm. The distance between the light sources 61, 62, 63, 64 and the light guiding film 1 is 100 mm. The distance between the receivers 65 and the light guiding film 1 is 157 mm.

Table 1 below shows the simulation results of the light guiding film 1. In the Table 1, the ratio of energy (73.86%) of the $\theta_t 0°\sim 180°$ represents the ratio of the total energy of the output light beams 31 measured by the receivers 65 from 0 to 180 degrees to the total energy provided by the light sources 61, 62, 63, 64. The ratio of energy (65.90%) of the $\theta_t 90°\sim 180°$ represents the ratio of the total energy of the output light beams 31 measured by the receivers 65 from 90 to 180 degrees to the total energy provided by the light sources 61, 62, 63, 64. The ratio of energy (44.97%) of the $\theta_t 90°\sim 105°$ represents the ratio of the total energy of the output light beams 31 measured by the receivers 65 from 90 to 105 degrees to the total energy provided by the light sources 61, 62, 63, 64. The ratio of energy (65.74%) of the $\theta_t 90°\sim 120°$ represents the ratio of the total energy of the output light beams 31 measured by the receivers 65 from 90 to 120 degrees to the total energy provided by the light sources 61, 62, 63, 64. The ratio of energy (70.32%) of the $\theta_t 85°\sim 120°$ represents the ratio of the total energy of the output light beams 31 measured by the receivers 65 from 85 to 120 degrees to the total energy provided by the light sources 61, 62, 63, 64.

The ratio of energy (89.23%) of the $\theta_t 90°\sim 180°/\theta_t 0°\sim 180°$ represents the ratio of the energy ratio (65.90%) of the $\theta_t 90°\sim 180°$ to the energy ratio (73.86%) of the $\theta_t 0°\sim 180°$. The ratio of energy (60.89%) of the $\theta_t 90°\sim 105°/\theta_t 0°\sim 180°$ represents the ratio of the energy ratio (44.97%) of the $\theta_t 90°\sim 105°$ to the energy ratio (73.86%) of the $\theta_t 0°\sim 180°$. The ratio of energy (89.00%) of the $\theta_t 90°-120°/\theta_t 0°\sim 180°$ represents the ratio of the energy ratio (65.74%) of the $\theta_t 90°-120°$ to the energy ratio (73.86%) of the $\theta_t 0°\sim 180°$. The ratio of energy (95.21%) of the $\theta_t 85°\sim 120°/\theta_t 0°\sim 180°$ represents the ratio of the energy ratio (70.32%) of the $\theta_t 85°\sim 120°$ to the energy ratio (73.86%) of the $\theta_t 0°\sim 180°$.

TABLE 1 the simulation results of the light guiding film 1

| Range of output angle | Ratio of energy |
|---|---|
| $\theta_t 0°\sim 180°$ | 73.86% |
| $\theta_t 90°\sim 180°$ | 65.90% |
| $\theta_t 90°\sim 105°$ | 44.97% |
| $\theta_t 90°\sim 120°$ | 65.74% |
| $\theta_t 85°\sim 120°$ | 70.32% |

TABLE 1-continued the simulation results of the light guiding film 1

| Range of output angle | Ratio of energy |
|---|---|
| $\theta_r 90°\sim180°/\theta_t 0°\sim180°$ | 89.23% |
| $\theta_r 90°\sim105°/\theta_t 0°\sim180°$ | 60.89% |
| $\theta_r 90°\sim120°/\theta_t 0°\sim180°$ | 89.00% |
| $\theta_r 85°\sim120°/\theta_t 0°\sim180°$ | 95.21% |

As shown in Table 1, because of the specific design of the first inclination angle $\theta_1$ (23 degrees) and the second inclination angle $\theta_2$ (24 degrees) of the embodiment, the ratio of energy of $\theta_r 85°\sim120°/\theta_t 0°\sim180°$ is 95.21%, which means 95.21% of the output light beams 31 are directed in the output angles from 85 to 120 degrees. Such range of the output angles from 85 to 120 degrees is desired, because the output light beams 31 with larger than 120 degrees will fall upon the ceiling near the window, and the output light beams 31 with less than 85 degrees will illuminate the human eye directly and cause glare. Therefore, the light guiding film 1 can guide the incident light beams 30 into the room near horizontally and avoid glare.

Figure 6:
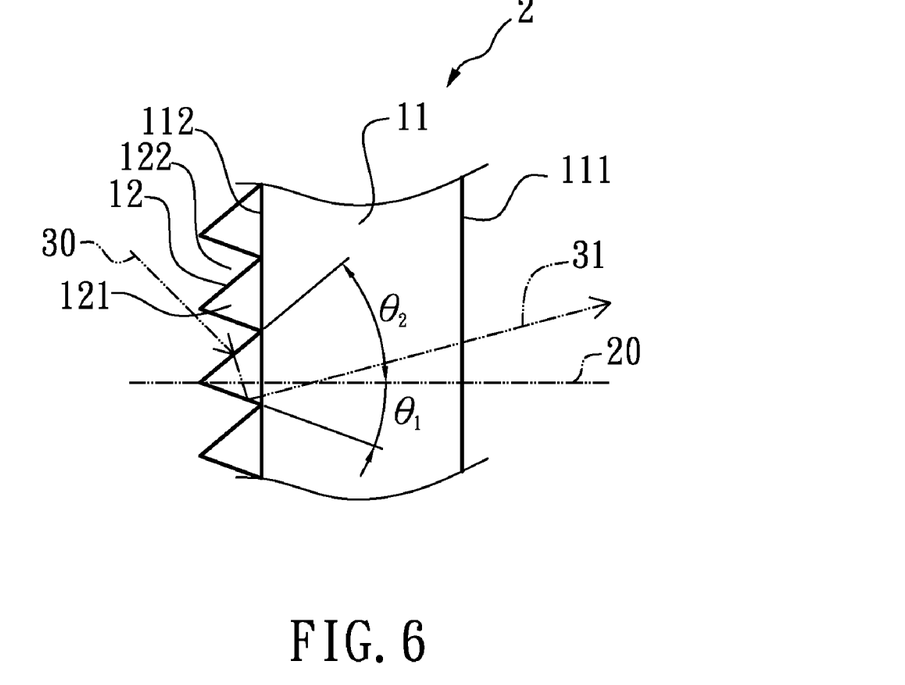
FIG. 6 is a partially enlarged side view of a light guiding film according to a second embodiment of the present invention.

FIG. 6 shows a partially enlarged side view of a light guiding film according to a second embodiment of the present invention. The light guiding film 2 of this embodiment is substantially the same as the light guiding film 1 (FIG. 3) of the first embodiment, and the same numerals are assigned to the same elements. The difference between the light guiding film 2 of this embodiment and the light guiding film 1 of the first embodiment lies in that, in this embodiment, the value of the first inclination angle $\theta_1$ is between 17 to 23 degrees, and the value of the second inclination angle $\theta_2$ is between 35 to 45 degrees. Preferably, the value of the first inclination angle $\theta_1$ is 20 degrees, and the value of the second inclination angle $\theta_2$ is 40 degrees.

Table 2 below shows the simulation results of the light guiding film 2. In the Table 2, the ratio of energy (72.11%) of the $\theta_t 0°\sim180°$ represents the ratio of the total energy of the output light beams 31 measured by the receivers 65 from 0 to 180 degrees to the total energy provided by the light sources 61, 62, 63, 64. The ratio of energy (52.74%) of the $\theta_r 90°\sim180°$ represents the ratio of the total energy of the output light beams 31 measured by the receivers 65 from 90 to 180 degrees to the total energy provided by the light sources 61, 62, 63, 64. The ratio of energy (31.81%) of the $\theta_r 90°\sim105°$ represents the ratio of the total energy of the output light beams 31 measured by the receivers 65 from 90 to 105 degrees to the total energy provided by the light sources 61, 62, 63, 64. The ratio of energy (52.08%) of the $\theta_r 90°\text{-}120°$ represents the ratio of the total energy of the output light beams 31 measured by the receivers 65 from 90 to 120 degrees to the total energy provided by the light sources 61, 62, 63, 64. The ratio of energy (56.80%) of the $\theta_r 85°\sim120°$ represents the ratio of the total energy of the output light beams 31 measured by the receivers 65 from 85 to 120 degrees to the total energy provided by the light sources 61, 62, 63, 64.

The ratio of energy (73.14%) of the $\theta_r 90°\sim180°/\theta_t 0°\sim180°$ represents the ratio of the energy ratio (52.74%) of the $\theta_r 90°\sim180°$ to the energy ratio (72.11%) of the $\theta_t 0°\sim180°$. The ratio of energy (44.11%) of the $\theta_r 90°\sim105°/\theta_t 0°\sim180°$ represents the ratio of the energy ratio (31.81%) of the $\theta_r 90°\sim105°$ to the energy ratio (72.11%) of the $\theta_t 0°\sim180°$. The ratio of energy (72.22%) of the $\theta_r 90°\text{-}120°/\theta_t 0°\sim180°$ represents the ratio of the energy ratio (52.08%) of the $\theta_r 90°\text{-}120°$ to the energy ratio (72.11%) of the $\theta_t 0°\sim180°$. The ratio of energy (78.76%) of the $\theta_r 85°\sim120°/\theta_t 0°\sim180°$ represents the ratio of the energy ratio (56.80%) of the $\theta_r 85°\sim120°$ to the energy ratio (72.11%) of the $\theta_t 0°\sim180°$.

TABLE 2 the simulation results of the light guiding film 2

| Range of output angle | Ratio of energy |
|---|---|
| $\theta_t 0°\sim180°$ | 72.11% |
| $\theta_r 90°\sim180°$ | 52.74% |
| $\theta_r 90°\sim105°$ | 31.81% |
| $\theta_r 90°\sim120°$ | 52.08% |
| $\theta_r 85°\sim120°$ | 56.80% |
| $\theta_r 90°\sim180°/\theta_t 0°\sim180°$ | 73.14% |
| $\theta_r 90°\sim105°/\theta_t 0°\sim180°$ | 44.11% |
| $\theta_r 90°\sim120°/\theta_t 0°\sim180°$ | 72.22% |
| $\theta_r 85°\sim120°/\theta_t 0°\sim180°$ | 78.76% |

Compared with the Table 1, the ratio of energy (78.76%) of $\theta_r 85°\sim120°/\theta_t 0°\sim180°$ of the second embodiment is less than that (95.21%) of the first embodiment. However, the sum of the first inclination angle $\theta_1$ and the second inclination angle $\theta_2$ of the second embodiment is greater than that of the first embodiment, which make the processing of the light guiding film 2 easier.

Figure 7:
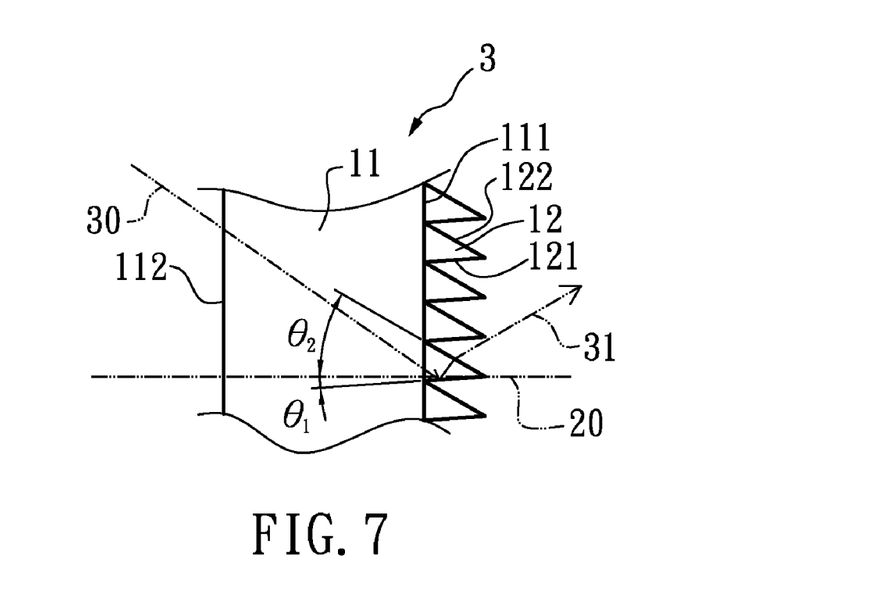
FIG. 7 is a partially enlarged side view of a light guiding film according to a third embodiment of the present invention.

FIG. 7 shows a partially enlarged side view of a light guiding film according to a third embodiment of the present invention. The light guiding film 3 of this embodiment is substantially the same as the light guiding film 1 (FIG. 3) of the first embodiment, and the same numerals are assigned to the same elements. The difference between the light guiding film 3 of this embodiment and the light guiding film 1 of the first embodiment lies in that, in this embodiment, the microstructure 12 is disposed on the first side 111 of the film base 11, and the second side 112 of the film base 11 faces the incident light beams 30. In addition, the value of the first inclination angle $\theta_1$ is between 3 to 5 degrees, and the value of the second inclination angle $\theta_2$ is between 27 to 33 degrees. Preferably, the value of the first inclination angle $\theta_1$ is 4 degrees, and the value of the second inclination angle $\theta_2$ is 30 degrees.

Table 3 below shows the simulation results of the light guiding film 3. In the Table 3, the ratio of energy (86.92%) of the $\theta_t 0°\sim180°$ represents the ratio of the total energy of the output light beams 31 measured by the receivers 65 from 0 to 180 degrees to the total energy provided by the light sources 61, 62, 63, 64. The ratio of energy (84.96%) of the $\theta_r 90°\sim180°$ represents the ratio of the total energy of the output light beams 31 measured by the receivers 65 from 90 to 180 degrees to the total energy provided by the light sources 61, 62, 63, 64. The ratio of energy (23.52%) of the $\theta_r 90°\sim105°$ represents the ratio of the total energy of the output light beams 31 measured by the receivers 65 from 90 to 105 degrees to the total energy provided by the light sources 61, 62, 63, 64. The ratio of energy (65.91%) of the $\theta_r 90°\text{-}120°$ represents the ratio of the total energy of the output light beams 31 measured by the receivers 65 from 90 to 120 degrees to the total energy provided by the light sources 61, 62, 63, 64. The ratio of energy (65.98%) of the $\theta_r 85°\sim120°$ represents the ratio of the total energy of the output light beams 31 measured by the receivers 65 from 85 to 120 degrees to the total energy provided by the light sources 61, 62, 63, 64.

The ratio of energy (97.74%) of the $\theta_r 90°\sim180°/\theta_t 0°\sim180°$ represents the ratio of the energy ratio (84.96%) of the $\theta_r 90°\sim180°$ to the energy ratio (86.92%) of the $\theta_t 0°\sim180°$. The ratio of energy (27.06%) of the $\theta_r 90°\sim105°/\theta_t 0°\sim180°$ represents the ratio of the energy ratio (23.52%) of the $\theta_r 90°\sim105°$ to the energy ratio (86.92%) of the $\theta_i 0°\sim180°$. The ratio of energy (75.83%) of the $\theta_r 90°-120°/\theta_i 0°\sim180°$ represents the ratio of the energy ratio (65.91%) of the $\theta_r 90°-120°$ to the energy ratio (86.92%) of the $\theta_i 0°\sim180°$. The ratio of energy (75.91%) of the $\theta_r 85°\sim120°/\theta_i 0°\sim180°$ represents the ratio of the energy ratio (65.98%) of the $\theta_r 85°\sim120°$ to the energy ratio (86.92%) of the $\theta_i 0°\sim180°$.

TABLE 3 the simulation results of the light guiding film 3

| Range of output angle | Ratio of energy |
| --- | --- |
| $\theta_r 0°\sim180°$ | 86.92% |
| $\theta_r 90°\sim180°$ | 84.96% |
| $\theta_r 90°\sim105°$ | 23.52% |
| $\theta_r 90°\sim120°$ | 65.91% |
| $\theta_r 85°\sim120°$ | 65.98% |
| $\theta_r 90°\sim180°/\theta_i 0°\sim180°$ | 97.74% |
| $\theta_r 90°\sim105°/\theta_i 0°\sim180°$ | 27.06% |
| $\theta_r 90°\sim120°/\theta_i 0°\sim180°$ | 75.83% |
| $\theta_r 85°\sim120°/\theta_i 0°\sim180°$ | 75.91% |

Figure 8:
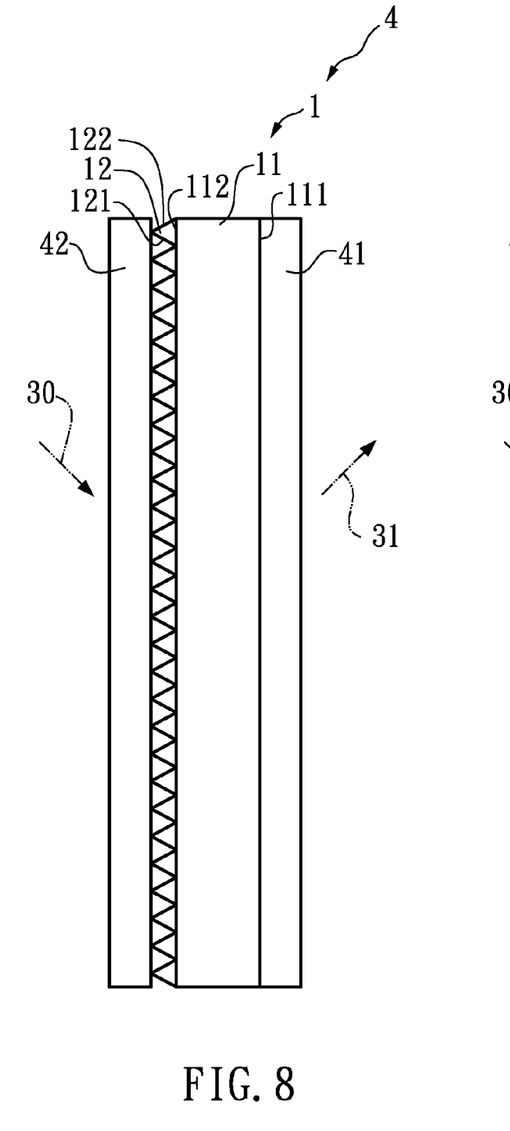
FIG. 8 is a side view of a window system according to a fourth embodiment of the present invention.

FIG. 8 shows a side view of a window system according to a fourth embodiment of the present invention. The window system 4 comprises a first protective plate 41, a first protective plate 42 and a light guiding film 1. The second protective plate 42 is fixed to the first protective plate 41 to form a closed space. The light guiding film 1 is the same as the light guiding film 1 (FIGS. 1 to 4) of the first embodiment, and is disposed in the accommodating space between the first protective plate 41 and the second protective plate 42. The light guiding film 1 comprises a film base 11 and at least one microstructure 12. The first protective plate 41, the second protective plate 42, the film base 11, and the microstructure 12 are light transmissible, and the second protective plate 42 faces the incident light beams 30. Preferably, the material of the first protective plate 41 and the second protective plate 42 are glass.

The light guiding film 1 is attached to the first protective plate 41 or the second protective plate 42. In the embodiment, the first side 111 of the film base 11 is attached to the first protective plate 41, the microstructure 12 is disposed on the second side 112 of the film base 11, the value of the first inclination angle $\theta_1$ is between 21 to 25 degrees, and the value of the second inclination angle $\theta_2$ is between 20 to 28 degrees. Preferably, the value of the first inclination angle $\theta_1$ is 23 degrees, and the value of the second inclination angle $\theta_2$ is 24 degrees.

It is to be understood that the light guiding film 1 can be replaced by the light guiding film 2 of the second embodiment. The first side 111 of the film base 11 of the light guiding film 2 is attached to the first protective plate 41, the microstructure 12 is disposed on the second side 112 of the film base 11, the value of the first inclination angle $\theta_1$ is between 17 to 23 degrees, and the value of the second inclination angle $\theta_2$ is between 35 to 45 degrees. Preferably, the value of the first inclination angle $\theta_1$ is 20 degrees, and the value of the second inclination angle $\theta_2$ is 40 degrees.

Figure 9:
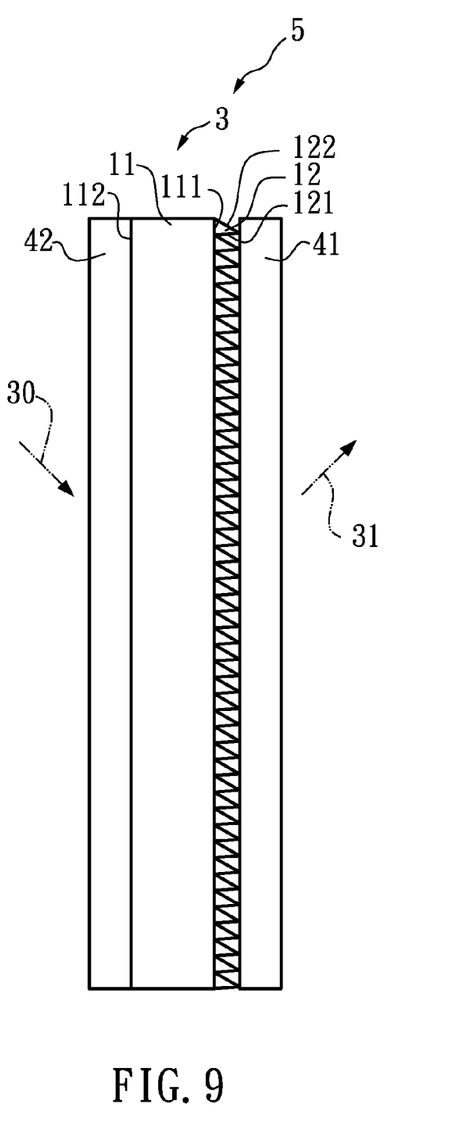
FIG. 9 is a side view of a window system according to a fifth embodiment of the present invention.

FIG. 9 shows a side view of a window system according to a fifth embodiment of the present invention. The window system 5 comprises a first protective plate 41, a first protective plate 42 and a light guiding film 3. The second protective plate 42 is fixed to the first protective plate 41 to form a closed space. The light guiding film 3 is the same as the light guiding film 3 (FIG. 7) of the third embodiment, and is disposed in the accommodating space between the first protective plate 41 and the second protective plate 42. The light guiding film 3 comprises a film base 11 and at least one microstructure 12. The first protective plate 41, the second protective plate 42, the film base 11, and the microstructure 12 are light transmissible, and the second protective plate 42 faces the incident light beams 30. Preferably, the material of the first protective plate 41 and the second protective plate 42 are glass.

The light guiding film 3 is attached to the second protective plate 42. In the embodiment, the second side 112 of the film base 11 is attached to the second protective plate 42, the microstructure 12 is disposed on the first side 111 of the film base 11, the value of the first inclination angle $\theta_1$ is between 3 to 5 degrees, and the value of the second inclination angle $\theta_2$ is between 27 to 33 degrees. Preferably, the value of the first inclination angle $\theta_1$ is 4 degrees, and the value of the second inclination angle $\theta_2$ is 30 degrees.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A light guiding film comprising:
    a film base, having a first side and a second side opposite the first side; and
    at least one microstructure, disposed on the first side or the second side of the film base, and comprising a first surface and a second surface above the first surface, wherein a first inclination angle is between the first surface and a reference plane, the reference plane is perpendicular with the film base, a second inclination angle is between the second surface and the reference plane;
    whereby a plurality of incident light beams becomes a plurality of output light beams after passing through the light guiding film, an output angle is defined as the angle between the output light beam and the light guiding film, the output angle is defined as 0 degree when the output light beam is downward and parallel with the light guiding film, the output angle is defined as 180 degrees when the output light beam is upward and parallel with the light guiding film, the total energy of the output light beams with the output angles from 85 to 120 degrees is more than 40% of the total energy of the output light beams with the output angles from 0 to 180 degrees.

2. The light guiding film as claimed in claim 1, wherein the light guiding film is attached to a glass of a window of a room, the incident light beams are the sunlight beams outside the room, and the output light beams inside the room.

3. The light guiding film as claimed in claim 1, wherein the cross section of the at least one microstructure is substantially triangle.

4. The light guiding film as claimed in claim 3, wherein the at least one microstructure further comprises a curved chamfer, the curved chamfer is disposed between the first surface and the second surface, and adjacent to the first surface and the second surface.

5. The light guiding film as claimed in claim 1, wherein the incident light beams are downward, and more than 50% of the output light beams are upward.

6. The light guiding film as claimed in claim 1, wherein an incident angle is defined as the angle between the incident light beam and the reference plane, the incident angle is defined as positive when the incident light beam is downward, the incident angles of the incident light beams are from 30 to 60 degrees.

7. The light guiding film as claimed in claim 1, wherein the value of the first inclination angle is different from that of the second inclination angle.

8. The light guiding film as claimed in claim 1, wherein the at least one microstructure is disposed on the second side of the film base, the value of the first inclination angle is between 21 to 25 degrees, and the value of the second inclination angle is between 20 to 28 degrees.

9. The light guiding film as claimed in claim 8, wherein the at least one microstructure faces the incident light beams.

10. The light guiding film as claimed in claim 8, wherein the value of the first inclination angle is 23 degrees, and the value of the second inclination angle is 24 degrees.

11. The light guiding film as claimed in claim 1, wherein the at least one microstructure is disposed on the second side of the film base, the value of the first inclination angle is between 17 to 23 degrees, and the value of the second inclination angle is between 35 to 45 degrees.

12. The light guiding film as claimed in claim 11, wherein the at least one microstructure faces the incident light beams.

13. The light guiding film as claimed in claim 11, wherein the value of the first inclination angle is 20 degrees, and the value of the second inclination angle is 40 degrees.

14. The light guiding film as claimed in claim 1, wherein the at least one microstructure is disposed on the first side of the film base, the value of the first inclination angle is between 3 to 5 degrees, and the value of the second inclination angle is between 27 to 33 degrees.

15. The light guiding film as claimed in claim 14, wherein the second side of the film base faces the incident light beams.

16. The light guiding film as claimed in claim 14, wherein the value of the first inclination angle is 4 degrees, and the value of the second inclination angle is 30 degrees.

17. The light guiding film as claimed in claim 1, wherein the total energy of the output light beams with the output angles from 85 to 120 degrees is more than 50% of the total energy of the output light beams with the output angles from 0 to 180 degrees.

18. The light guiding film as claimed in claim 1, wherein the total energy of the output light beams with the output angles from 85 to 120 degrees is more than 60% of the total energy of the output light beams with the output angles from 0 to 180 degrees.

19. The light guiding film as claimed in claim 1, wherein the total energy of the output light beams with the output angles from 85 to 120 degrees is more than 70% of the total energy of the output light beams with the output angles from 0 to 180 degrees.

20. A window system comprising:
a first protective plate;
a second protective plate, fixed to the first protective plate; and
a light guiding film disposed in an accommodating space between the first protective plate and the second protective plate, the light guiding film being attached to the first protective plate or the second protective plate, and comprising:
a film base, having a first side and a second side opposite the first side; and
at least one microstructure, disposed on the first side or the second side of the film base, and comprising a first surface and a second surface above the first surface, wherein a first inclination angle is between the first surface and a reference plane, the reference plane is perpendicular with the film base, a second inclination angle is between the second surface and the reference plane;
whereby a plurality of incident light beams becomes a plurality of output light beams after passing through the light guiding film, an output angle is defined as the angle between the output light beam and the light guiding film, the output angle is defined as 0 degree when the output light beam is downward and parallel with the light guiding film, the output angle is defined as 180 degrees when the output light beam is upward and parallel with the light guiding film, the total energy of the output light beams with the output angles from 85 to 120 degrees is more than 40% of the total energy of the output light beams with the output angles from 0 to 180 degrees.

21. The window system as claimed in claim 20, wherein the incident light beams are the sunlight beams outside a room, and the output light beams inside the room.

22. The window system as claimed in claim 20, wherein the first protective plate, the second protective plate, the film base, and the at least one microstructure are light transmissible, and the second protective plate faces the incident light beams.

23. The window system as claimed in claim 20, wherein the material of the first protective plate and the second protective plate are glass.

24. The window system as claimed in claim 20, wherein the first side of the film base is attached to the first protective plate, the at least one microstructure is disposed on the second side of the film base, the value of the first inclination angle is between 21 to 25 degrees, and the value of the second inclination angle is between 20 to 28 degrees.

25. The window system as claimed in claim 20, wherein the first side of the film base is attached to the first protective plate, the at least one microstructure is disposed on the second side of the film base, the value of the first inclination angle is between 17 to 23 degrees, and the value of the second inclination angle is between 35 to 45 degrees.

26. The window system as claimed in claim 20, wherein the second side of the film base is attached to the second protective plate, the at least one microstructure is disposed on the first side of the film base, the value of the first inclination angle is between 3 to 5 degrees, and the value of the second inclination angle is between 27 to 33 degrees.

* * * * *